United States Patent

[11] 3,619,344

[72] Inventors Leon Edward Wolinski
 Buffalo, N.Y.;
 Roland G. Harris, Chadds Ford, Pa.
[21] Appl. No. 848,206
[22] Filed Aug. 7, 1969
[45] Patented Nov. 9, 1971
[73] Assignee E. I. du Pont de Nemours and Company
 Wilmington, Del.
 Continuation-in-part of application Ser. No. 767,093, Oct. 14, 1968, now abandoned.

[54] ORIENTED FOAM LAMINAR STRUCTURES
 17 Claims, 5 Drawing Figs.
[52] U.S. Cl. .................................................... 161/161,
 161/160, 161/231, 161/252, 161/254, 161/402,
 156/282, 156/309, 156/313
[51] Int. Cl. ...................................................... B32b 3/12
[50] Field of Search ............................................ 161/402,
 160, 161, 254, 231, 252

[56] References Cited
 UNITED STATES PATENTS

| | | | |
|---|---|---|---|
| 2,770,406 | 11/1956 | Lane .............................. | 161/161 |
| 3,229,814 | 1/1966 | Cowman ....................... | 161/161 |
| 3,398,035 | 8/1968 | Cleereman et al. ........... | 161/161 |
| 3,431,164 | 3/1969 | Gilbert ......................... | 161/161 |
| 3,502,532 | 3/1970 | Frielingsclorf ............... | 161/161 |

Primary Examiner—William J. Van Balen
Attorney—Donald W. Huntley

ABSTRACT: A laminar structure comprising oriented foam having thermoformable thermoplastic film bonded to the surfaces thereof and process for its preparation.

PATENTED NOV 9 1971
3,619,344
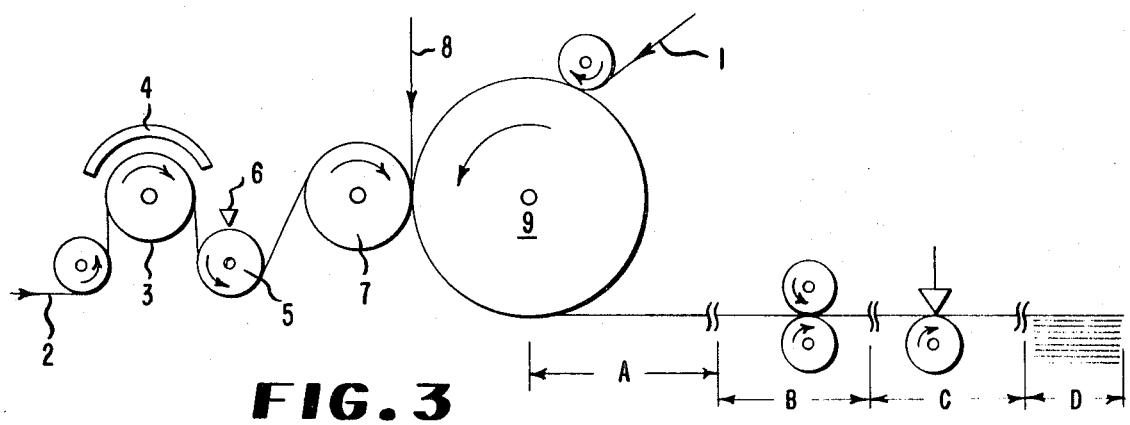
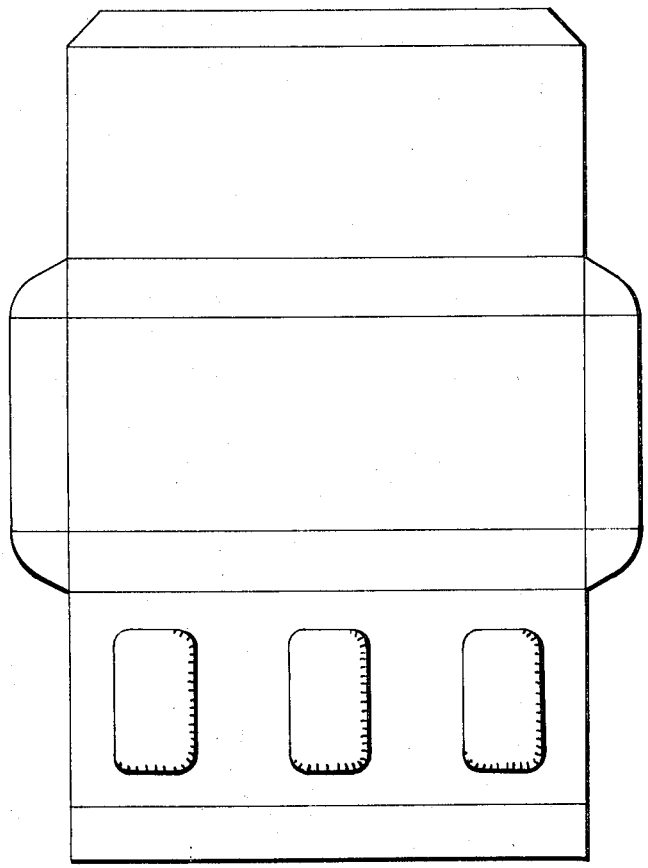
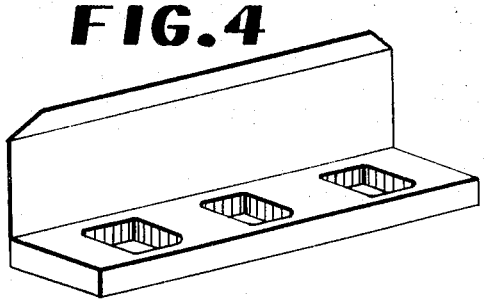
INVENTOR
LEON E. WOLINSKI
BY
ATTORNEY

ORIENTED FOAM LAMINAR STRUCTURES

CROSS-REFERENCE TO RELATED APPLICATION

This is a Continuation-In-Part of our copending Application Ser. No. 767,093, filed Oct. 14, 1968, now abandoned.

BACKGROUND OF THE INVENTION

Despite the widespread use of paperboard in the packaging industry, certain limitations in its utility have long been recognized. For example, paperboard packages are weakened by moisture and are not impervious to greases and oils. Consequently, when packaging certain types of foods and cosmetics, paperboard packages generally require a secondary wrap for the packaged article to preserve the integrity and appearance of the package. Other physical characteristics of paperboard have limited the forms of the package and the types of surface treatment which could be used on paperboard packaging materials, since paperboard cannot be thermoformed or deeply embossed.

Previous attempts to overcome these inherent limitations have included lamination of various waterproof coatings onto paperboard so as to enable it to withstand grease and moisture. Paper itself has also been bonded onto certain foam materials to improve the cushioning qualities of the packaging materials, as illustrated in U.S. Pat. No. 2,770,406. Still other attempts to prepare economical packaging materials include laminated foam structures as described in Cowman U.S. Pat. No. 3,229,814. Laminated structures prepared according to the Cowman specification comprise a sandwich of thermoplastic film on either side of a foam of expanded polystyrene beads. While these structures are relatively impervious to moisture and greases, they are of limited applicability in that they do not exhibit the structural integrity necessary for use in cartons.

SUMMARY OF THE INVENTION

The instant invention provides a material having unique physical properties that renders it especially suitable for use as a packaging material as well as a wide variety of other applications. Specifically, the instant invention provides a laminated structure comprising a. a core of oriented closed cell foam having an elongation of less than about 50 percent and consisting essentially of styrene polymer having a tensile modulus greater than 150,000 p.s.i., and b. thermoplastic film having a tensile modulus greater than 150,000 p.s.i. and thermoformable within a temperature of about from 50° to 230° C., bonded to both sides of the core.

The instant invention also provides packages prepared from this laminated structure. The invention further provides a process for the preparation of these laminates, which comprises bonding the film to both sides of the core at elevated temperatures, and maintaining the laminated structure in a substantially flat configuration while cooling the structure below the distortion temperature thereof, and preferably below 40° C.

Preferably, the laminates are creasable, the thermoplastic film having a percent elongation at break greater than $t/R$, wherein $t$ is the thickness of the film and R is the radius of the creasing edge.

BRIEF DESCRIPTION OF THE DRAWINGS

FIG. 1 is a schematic illustration of an apparatus which can be used to make the laminar structures of the instant invention.

FIG. 2 is a cross sectional view of one specific embodiment of the instant invention.

FIG. 3 illustrates a sheet of the subject laminate cut and scored to form a box, having three tubs thermoformed in the laminated sheet.

Fig. 4 illustrates the cut, scored, thermoformed sheet of FIG. 3 folded into a box.

FIG. 5 illustrates a box formed from the laminar structures of the instant invention having a spout and handgrip thermoformed into the box and embossing on the surface thereof for decorative purposes and to aid in gripping the box.

DESCRIPTION OF THE PREFERRED EMBODIMENTS

As indicated above, foams which can be used in the laminar structures of the instant invention should have an elongation of less than 50 percent and preferably less than 8 percent. Polystyrene foams having an elongation of about from 2.5 to 8.0 percent are especially preferred. By elongation is meant the linear extension of the foam at break. In addition, the foam should be prepared from a polymer having a tensile modulus of greater than 150.000 p.s.i., as determined by ASTM D882 –64T.

Oriented styrene polymer foams which can be used in the instant invention can be prepared from polymers of styrene and its methyl derivatives, for example, poly(alpha-methylstyrene), poly(2,4-dimethylstyrene), as well as copolymers and blends of styrenes such as poly(styrene-butadiene), and poly(acrylonitrile-styrene). In general, for most packaging applications, the oriented form portion of the laminated structure will have a thickness of about from 10–100 mils, and preferably about from 12–38 mils. In those embodiments of the instant invention using an oriented polystyrene foam, the foam should have a density of about from 0.5 to 20 pounds per cubic foot, and a density of about from 5–10 pounds per cubic foot has been found to be particularly well suited for packaging purposes. Such polystyrene foams can be prepared by techniques well-known to those skilled in the art as described in detail in Plastics Technology, Aug., 1966, pages 41–44, and Sept., 1966, pages 46–49. Extruded, oriented polystyrene foams suitable for use in the instant invention are also commercially available from Sinclair-Koppers of Pittsburgh, Penna., and Plastics Systems Incorporated, Carlstadt, N.J.

A critical feature of the instant invention is that the foam be oriented by a biaxial stretching of the foam about from two-12 times. Because of the wide spread use of tubular extrusion and expansion in the preparation of foam sheets, it has been found economically desirable to use foams having been stretched about five times in the transverse direction and about three-12 times in the machine direction.

The film laminated to the foam core in the structures of the instant invention should be thermoformable at temperatures of about from 50° C. to 230° C. and should have a tensile modulus of at least 150,000 p.s.i. These films can be prepared from a wide variety of polymers, including, for example, homopolymers and copolymers of polyvinyl chloride biaxially oriented at least two times in each direction; polypropylene; polyesters such as polyethylene terephthalate; acrylonitrile-butadiene-styrene polymers; polystyrene and modified polystyrenes, e.g., poly(alpha-methylstyrene) and poly(2,4-dimethylstyrene); oriented polyethylenes; polyamides, polycarbonates and modified acrylic interpolymers. For certain uses requiring a product of great flexibility and softer hand, ethylene polymers and copolymers are particularly useful. However, in general, films formed from polyvinyl chloride or polypropylene are preferred for use in the structures of the instant invention because of their excellent thermoformability and drawability. Unplasticized polyvinyl chloride film is particularly preferred, these films generally having a tensile modulus of from 330,000 to 385,000 p.s.i. Polyvinyl chloride copolymers that can be used include those having from 6 to 8 percent propylene or vinyl acetate comonomer. These copolymers have Tensile Moduli of 260,000 to 300,000 p.s.i.

The thermoformable, thermoplastic films can also contain various modifiers such as up to about 25 percent pigments or ultraviolet light absorbers to modify the visual characteristics or performance of the coating film. For example, incorporation of titanium dioxide pigment in polyvinyl chloride or polypropylene films tends to increase the whiteness of the laminated structure and to mask imperfections in the surface of the core foam. Natural or synthetic fibers or fiberglass can also be incorporated into the film to increase the stiffness of the laminated structures.

In order that the laminates of the invention be creasable, for example, for the manufacture of folding carton blanks, it has been found that the percent elongation of the outer films at their breaking point be greater than the function $(t/R)$; wherein $t$ is the thickness of the film and $R$ is the radius of the creasing edge, e.g., the knife or rule. In general, the films should have an elongation of greater than about 5 percent.

The elongation of a particular film used is generally measured according to ASTM-D882-Method A. It should be noted, however, that the elongation of the film should be measured at the strain rate experienced in the actual creasing operation, which may exceed the 100 percent/minute strain rate used in the above ASTM test.

In general, the films will have a thickness of about from 0.25 to 5.0 mils. The films can be used as-cast or extruded, or can be molecularly oriented by uniaxial or biaxial stretching. Except as previously indicated to achieve the required Tensile Modulus, the laminar composite can have any combination of films or varying types and degrees or orientation. For example, a structure can be prepared having uniaxially oriented films as the outer layers, applied in opposed stretched directions. Polyvinyl chloride films used in the instant invention are generally oriented about 2–6 times in each of two directions.

The bond strength of the laminates is an important feature in their commercial utility, and the strength of the film-foam bond should be at least 250, and preferably 300 grams per lineal inch. Inadequate bond strength can result in unsatisfactory cutting, creasing and thermoforming performance. In addition, poor bond strength diminishes the utility of the laminates for reusable hinges and substantially decreases their structural strength.

The structures of the instant invention can be prepared by lamination according to any of several methods generally available to those skilled in the art. However, since the extruded, oriented foams are heat and/or solvent sensitive, certain precautions should be observed for the preparation of satisfactory laminated structures. Because of the problems of temperature control, coating oriented foams with melt extruded polymers frequently gives poor adhesion; solvent based adhesives may attack and destroy the oriented foam structure; many water based adhesives require coalescence temperatures above that point at which the oriented foams are stable. These difficulties can be overcome, for example, through use of a heat sink, such as a cold drum, to stabilize the temperature of the bulk of the oriented foam during lamination, and the control of the relative proximity of solvent and foam when a solvent-based adhesive is used.

The laminated structures can be prepared, for example, by melt extrusion of the film layers onto the foam layers, or the layers can be laminated by conventional hot lamination techniques as illustrated in Cleereman, U.S. Pat. No. 3,325,332, hereby incorporated by reference. In nonadhesive bonding situations, a major portion of the foam core should be maintained below its distortion temperature. By maintaining the foam in contact with a cooled drum, for example, the surface of the foam can be heated to the bonding temperatures while maintaining the remainder of the foam below the required 80°–100° C. For bond strengths which are satisfactory for packaging applications, the heated surfaces in nonadhesive bonding situations should be at a temperature and pressure to obtain wetting contact at the interface.

A lamination technique preferred in the preparation of the structures of the instant invention involves the use of an adhesive to secure the film layers to the foam core. The use of an adhesive offers an economic advantage over hot lamination techniques in that sophisticated equipment from temperature control in the hot lamination techniques is unnecessary and more precise control of the thickness of the final film structure and uniformity of bonding is more readily achieved. It has been found that the use of an adhesive in the laminated structures of the instant invention does not effect the thermoformability or other desirable qualities of the instant products so long as the adhesive provides a peel strength for the laminated structure of at least 250 grams per lineal inch when peeled from the foam at an angle of 180° at the rate of 12inch/minute on an "Instron" tester.

Solvent based adhesives can be used by first applying the adhesive to a transfer drum and then evaporating the solvent from the exposed surface of the adhesive. The solvent-sensitive oriented foam is heated on the surface while maintaining the bulk cold and is nipped onto the surface-dried adhesive on the transfer drum. The solvent that was present on the underside of the adhesive while on the transfer drum is evaporated from its new outside surface on the oriented foam. By this technique, the solvent never comes in direct contact with the foam, thus preventing solvent attack of the oriented foam. By this technique, the solvent never comes in direct contact with the foam, thus preventing solvent attack of the oriented foam. The adhesive coated oriented foam now is ready for lamination to the outer thermoplastic film. The procedure is the same for each of the two surfaces of the oriented foam.

Adhesive-type polymers that coalesce at 80° C. or above from water dispersions or suspensions can be coalesced by coating onto the surface of the oriented foam, and then heating the coated surface while keeping the bulk of the oriented foam cold. This technique provides an adhesive coated oriented foam suitable for subsequent lamination by melt coating or press lamination.

An apparatus particularly well suited for producing the composites of the instant invention is schematically illustrated in FIG. 1, wherein the film 1 is melt laminated onto preheated oriented foam 2. Many oriented styrene polymer foams are heat sensitive, and they tend to distort drastically at about 80° C. Consequently, preheating of the foam must be carefully controlled. In the apparatus of FIG. 1, the oriented foam is supported by a cold roll 3 to permit heating of the surface of the oriented foam by infrared heater 4 to nearly the melting point of the polymer while maintaining most of the oriented foam at a much lower temperature. The foam passes over an intermediate roll 5 having an air knife 6 cooling the roll surface. The foam then passes over cold nip roll 7 at which point the foam comes into contact with hot melt adhesive 8 and film 1, and drawn through the nip formed by the cold nip roll and quench drum 9.

In an alternative procedure, adhesive can be precoated onto the film, heat activated by a hot roll and bonded to a preheated oriented foam surface. This technique can be modified to laminate both sides of the oriented foam at one time by employing two rolls to preheat the adhesive coated film and to laminate to the oriented foam.

The foam can be precoated with adhesive, for example, by coalescence of dispersions of adhesive on the foam surface, as illustrated in example 9. Careful temperature control is the coalescing is essential, since too high a temperature will distort or collapse the foam, while too low a temperature or too short a residence time under a heater will result in inadequate coalescence, often characterized by chalky, nonadherent coatings.

A wide variety of adhesives can be used in the laminates of the instant invention. These include resins such as ethylene/vinyl acetate copolymer combinations, e.g., those commercially available from E. I. du Pont de Nemours and Company as "Elvax 250", and "Elvax 260;" aqueous dispersions of resins, such as a 40/55/5 mixture of ethyl acrytate/methyl methacrylate/methacrylic acid; solvent based adhesive as iminated butyl acrylate/butyl methacrylate/methyl methacrylate/methacrylic acid in the proportions of 9/45·7/35·3/10 in 70/30 toulene/isopropanol, the 2,4 toluene diisocyanate adduct of trimethylol propane in methyl ethyl ketone, and butyl acrylate/methyl methacrylate/methacrylic acid 44.5/44.5/11 in 70/30 toluene/isopropanol. The only critical feature, as indicated above, is that the adhesive provide a peel strength of at least 250 grams/inch.

The thickness of the dried adhesive usually varies from about 0.1 to 5.0 mils and is most often about 0.4 mil. Optimum adhesion in the structures is generally obtained at the highest temperature at which the components can be maintained. The controlling variables are the surface temperatures of the film, oriented foam and adhesives at the time they are joined.

The adhesive can have a pigment such as titanium dioxide incorporated therein to mask imperfections in the foam surface texture and to control the color of the final product. Pigmentation of the adhesive is preferred over pigmentation of the outer films to prevent the pigment in the film from rubbing off on the rolls used in the printing operation. The quantity of pigment in the adhesive can vary from about 1 to up to about 40 percent, the upper limit depending upon the critical pigment volume concentration. The concentration of pigment in the adhesive will generally vary about from 4 to 10 percent by weight. Pigmented adhesives are commercially available as roughly 20 percent concentrates and can be blended by tumbling and applied as required.

For most applications for the laminar structures of the instant invention, including use in carton manufacture, it is desirable that the structures of the instant invention be free from warping. While various complex techniques have been used in the art for processing foams to prevent warping, it has been found that warping of the laminated structures according to the instant invention can be prevented by a surprisingly simple manufacturing procedure. Specifically, the polystyrene foam, after lamination, is retained in a flattened condition in zone A of FIG. 1 while cooling through the distortion temperature range, that is, the temperature range at which the laminar composite would retain a permanent curvature corresponding to the shape of the quench drum. After cooling below the heat distortion temperature, and preferably below 40° C., the laminar composite can be calendered in zone B and cut into appropriate sheet dimensions in zone C. The laminate is then stacked and indexed in zone D. Indexing is important to avoid edge imprinting on adjacent sheets. The distortion temperature will vary according to the particular foam used, but usually falls between about 80° and 100° C., and the cooling stage should be adjusted accordingly.

The structures of the instant invention can be readily thermoformed to a depth of up to about three inches. Applicable thermoforming techniques include those generally used by those skilled in the art, as described, for example, in Plastics Technology, Nov. 1966, pages 54–58, thereby incorporated by reference.

The laminated products of the instant invention exhibit unique qualities which make them particularly suitable for a wide variety of packaging and decorative applications. The structures of the instant invention have sufficient structural integrity to permit their use as folding cartons, and, at the same time, their thermoformability permits a variety of shapes unobtainable with the paperboard normally used for packaging. This thermoformability permits the embossing of packaging materials to achieve unique surface effects on the finished package. Further, handgrips and spouts can be formed in packages to improve their functional utility. Since these laminar structures can be thermoformed to a depth up to about 3 inches, packages can also be made having thermoformed tubs or partitions, thus eliminating the need for a separate partition, for example, in cookie boxes containing a variety of cookies. Such a package is illustrated in FIGS. 3 and 4, FIG. 3 illustrating a cut, scored, blank having three tubs thermoformed into one surface thereof. The upper section of the blank illustrated in FIG. 3, upon folding, becomes the top of the box while the large center section of the blank illustrated in FIG. 3 becomes the bottom of the finished box. Thus, the thermoformed tubs at the bottom of the blank are sandwiched between the top and bottom sections in the box, and serve as internal partitions for the completed package. The laminates can be readily heat-sealed by conventional techniques, such as, ultrasonic, dielectric, interfacial surface heating including infrared, conduction or convection as well as solvent sealing. Using conventional carton forming equipment and heating the laminates with high watt density infrared heaters and hot air, excellent heat seals of 3000 grams/inch can be obtained.

The thermoformability of these laminated structures also permits them to be embossed and thermoformed for decorative panels in a variety of uses including wall plaques, wall coverings, inside door kick panels for automobiles, backs of front car seats, rear window shelves, and trunk liners. In those embodiments of the instant invention utilizing a foam less heat sensitive than pure polystyrene, the laminar structures can be used in high temperature applications such as "heat-and-serve" trays or the like. The unique qualities of these laminates will make myriad other applications readily apparent to those skilled in the art.

One particularly remarkable feature of the laminar structures of the instant invention is that they can be used on conventional packaging machinery which is used for cutting and scoring paperboard without any substantial redesign or adjustment of the apparatus. Consequently, the laminar structures of the instant invention provide, for the first time, a packaging material which is amenable to both folding carton and thermoforming technology currently available to the industry. In addition, these laminar structures are readily adherent to conventional printing inks for printing advertising on the face of the package.

The laminar structures of the instant invention are superior to the paperboard previously used in the art in several respects. Not only does the instant invention function as well as paperboard with respect to cutting and creasing, but the quality of thermoforming, as indicated above, increases its versatility manyfold over paperboard. In addition, the instant laminates can be embossed to a substantially greater depth and relief dimension than paperboard, and the laminates exhibit infinitely improved grease resistance as well as several fold improvements in wet properties, tear strength crush resistance, impermeability, and burst resistance. The instant laminates are also heat sealable and have a high surface gloss and slip.

In the following example, which further illustrate the invention, parts and percentages are by weight, and the laminates are evaluated by the following tests:

Elongation percent is measured according to ASTM-D882-Method A.

Bond Strength is a measure of the ease of removing film from a substrate. The test is conducted by cutting through the film layer of the laminate with a razor blade in a number of lines one-eighth inch apart, cutting the ends of the resulting section of film away from the substrate, then attempting to strip the individual sections of film away from the substrate with a pair of tweezers. If the one-eighth inch sections of film can be stripped from the substrate, the bond is unsatisfactory, which is designated as NO; if the film sections cannot be stripped loose from the substrate, but break instead, the bonding is considered satisfactory and is designated CNS (cannot be stripped); if the film sections tear instead of break, the film bonding also is considered satisfactory and is designated T. In some cases, the bond strength is expressed as the force in grams/lineal inch, applied at an angle of 180°, at a rate of 12 inches/minute, required to separate the film from the substrate.

EXAMPLE 1

A film/foam/film laminated structure is prepared by adhesively bonding a 94/6 polyvinyl chloride/vinyl acetate copolymer film having a tensile modulus of 260,000 to 300,000 p.s.i. to both sides of an oriented polystyrene foam with an ethylene vinyl acetate adhesive. The polystyrene foam is 34 mils thick and is an extruded oriented foam commercially available from Plastics Systems Company, having an elongation of 5.5 percent, the polymer having a tensile modulus of from 400,000 to 600,000 p.s.i. The adhesive is a 72/28 ethylene-vinyl acetate copolymer pigmented with 6 percent white TiO$_2$.

The laminated structure is prepared using an apparatus of the type illustrated in FIG. 1. The oriented polystyrene foam is passed over a cold roll which is maintained at a temperature of 4° C. so as to maintain the bulk of the foam substantially below 80° C. while the surface of the foam is heated to a temperature of about from 140° to 150° C. by infrared heaters. The foam is then passed over an intermediate roll which is cooled by an air knife blowing on the surface thereof. The surface-heated foam is then passed over a nip roll maintained at 20° C. and passed through a nip where it is brought into contact with the ethylene vinyl acetate copolymers and the polyvinyl chloride film, the adhesive having been melted extruded at 250° C. and the adhesive layer having a thickness of about 0.4 mil. The nip gap is maintained at a thickness of 34.0 mils, which, with the 1 mil. thickness polyvinyl chloride film, maintains a pressure of about 80 p.s.i. on the oriented polystyrene foam. This pressure is adequate to satisfactorily laminate the film in the foam while not destroying the foam structure. The quench drum is maintained at a temperature of about 5° C. After passing through the nip, the laminated structure is maintained in a flattened condition until the entire construction is cooled below the distortion temperature. The process is then repeated to laminate a polyvinyl chloride film onto the opposite side of the foam, after which it is calendered between a set of nip rolls to a final composite thickness of 34 mils., cut into predetermined sheet sizes, stacked and indexed.

The laminar composite exhibits the following properties:

| Test | Direction | Value |
|---|---|---|
| Stiffness (g./cm.) | MD | 326 |
|  | TD | 216 |
| Bond Strength (g./in.) Side 1 | MD | 1150—foam tore |
|  | TD | 1075—foam tore |
| Side 2 | MD | 1050—foam tore |
|  | TD | 950—foam tore |
| Mullen Burst (lbs.) |  | 87 |
| Elmendorf Tear (g./mil.) | MD | 400 |
|  | TD | 710 |
| Permeability—IPV (g./100m.$^2$/24 hr.) |  | 68 |
| Unit Weight (0/1000 sq. ft.) |  | 54 |

The laminar composite is fabricated into blanks for folding cartons by cutting and creasing with conventional carton-forming apparatus. Handgrips and pour spouts are formed in the box blanks using standard vacuum forming equipment by preheating at 60° C. for 10 seconds followed by a 10-second forming cycle. The structures are folded into cartons and sealed with a hot melt adhesive. The resulting cartons are similar to that illustrated in FIG. 5.

Other of the laminar products are treated with vacuum forming equipment in a standard operation and made into thermoformed trays, separators for cosmetics, perfume and lipstick trays and deep, drawn wall plaques. Draw ratios (diameter/depth) of 3/1, 2/1, 1/1, 1/2 and 1/3 are employed successfully. The structures form excellent heat-seals by heating the surface to 160° C. using hot air as well as infrared heat while maintaining the bulk cool.

Other samples of the laminar products are printing and/or embossed with valley printing, reverse printing leather embossing, wood grain embossing, linen embossing and intaglio embossing to provide packaging or decorative materials of high esthetic appeal. A composite having been valley printed is dielectrically heat sealed to plasticized polyvinyl chloride film for use as a decorative wall covering.

EXAMPLE 2

The lamination procedure of example 1 is repeated, except that a polypropylene film, having a Tensile Modulus of 225,000 p.s.i., is used instead of the polyvinyl chloride copolymer in example 1, and the foam is 45 mils thick. The polypropylene film is a white pigmented film 1 mil. thick and biaxially oriented five times in each direction. The resulting laminar composite, after calendering, is 44 mils thick and exhibits the following properties.

| TEST | DIRECTION | VALUE |
|---|---|---|
| Taber Stiffness | MD | 326 |
|  | TD | 290 |
| Peel (g./in.) Side 1 | MD | 710 |
|  | TD | 460 |
| Side 2 | MD | 660 |
|  | TD | 380 |
| Mullen Burst (lbs.) |  | 85 |
| Elmendorf Tear (g./mil.) | MD | 340 |
|  | TD | 680 |
| Permeability (g/100m.$^2$/24 hrs.) |  | 63 |

The resulting composite is creased and cut into carton blanks as in example 1. The resulting structure is formed into a carton and glued with hot melt adhesive. The laminar composite is also vacuum thermoformed at a 3/1 diameter/depth ratio into trays, dishes and plaques.

EXAMPLES 3–7

In examples 3–7 the lamination procedure of example 1 is repeated, using the films, adhesives, and foams indicated in the following table.

| | Film | | | Adhesive | | Oriented foam | |
|---|---|---|---|---|---|---|---|
| Ex. | Polymer | Thickness (mils) | Tensil modulus (p.s.i.) | Type | Thickness (mils) | Polymer | Thickness (mils) |
| 3 | PVC/VA | 0.1–5.0 | 260,000–300,000 | Elva® 250 [1] | 0.1–1.0 | PS | 10–100 |
| 4 | PP | 0.1–5.0 | 225,000 | ....do.[1] | 0.1–1.0 | PS | 10–100 |
| 5 | ABS | 1.0 | 180,000 | ....do.[1] | 0.4 | PS | 12–38 |
| 6 | ABS | 0.1–5.0 | 180,000 | ....do.[1] | 0.1–1.0 | PS | 10–100 |
| 7 | PET | 1.0 | 600,000 | ....do.[1] | 0.4 | PS | 12–38 |

[1] 72/28 ethylene/vinyl acetate resin.
NOTE.—PVC/VA=94/6 polyvinyl chloride/vinyl acetate copolymer; PP=polypropylene; ABS=acrylonitrile-butadiene-styrene polymer; PET=polyethylene terephthalate; PS=polystyrene.

The resulting laminates exhibit product characteristics similar to those of examples 1 and 2.

EXAMPLE 8

A laminated structure is prepared from oriented polystrene foam having a thickness of 17 mils, 1 mil. thick films of acrylonitrile-butadiene-styrene polymer and a solvent based adhesive. The Tensile Modulus of the film is 180,000 p.s.i. The adhesive is BA/BMA/MMA/MAA in proportions of 9/45·7/35·3/10·1 iminated in 70/30 toluene isopropylene and having a 35 percent solids content. The adhesive is coated onto a drum covered with a film of Teflon fluorcarbon resin by means of a roll coater at a dry thickness of 0.2 mil. The solvent is removed from the outside surface of the adhesive coating by means of an air blower at 34° C.

The oriented foam is supported on a drum maintained at 34° C. while the surface of the foam is heated by infrared means to a temperature of 186° C. The surface-heated foam is brought into contact with the adhesive at a nip point and the adhesive thereby transferred to the surface of the oriented foam. The adhesive is then completely dried and the film laminated to the adhesive. The above procedure is then repeated to laminate a similar film to the opposite surface of the foam core.

The resulting laminated structure exhibits product characteristics equal to those of the laminates of example 1, and the bond strength of the laminated structure is such that the foam core tears upon attempting to separate the layers.

EXAMPLE 9

An oriented polystyrene foam, 17 mils thick is coated with a 40 percent solids dispersion of an iminated 40/55/5 ethyl acrylate/methacrylate/methacrylic acid polymer by means of a roll coater. The coated oriented foam is supported by a metal drum maintained at a temperature of 4°–6° C. and the upper surface of the coated foam is subjected to infrared radiation for a period of 3 seconds. During this period the adhesive is coalesced to form a glossy adherent coating substantially free from distortion. A 1 mil. ABS film having a Tensile Modulus of 180,000 p.s.i. is bonded to the coalesced adhesive at a pressure of 150 p.s.i.g. for 2 minutes. During bonding, the upper platen is maintained at a temperature of 150° C. and the lower platen at 20° C. The procedure is repeated to laminate a 1 mil ABS film to the opposite surface of the oriented foam, to yield a film/foam/film laminate having the product characteristics similar to those exhibited by the laminates of example 1.

EXAMPLE 10

A laminated structure is prepared according to the general procedure of example 1, except that uniaxially oriented polyester film having a thickness of 1 mil. and a Tensile Modulus of 600,000 p.s.i. is laminated to the foam so that the orientation axes of the outer films are in opposite directions, that is, along the longitudinal and transverse directions of the laminated structure, respectively.

The resulting laminated structure exhibits the following physical characteristics:

| | | |
|---|---|---|
| Taber Stiffness | MD | 450 |
| | TD | 450 |
| Peel Seal Strength (g./in.) | | |
| Side 1 | MD | 495 |
| | TD | 325 |
| Side 2 | MD | 325 |
| | TD | 525 |
| Mullen Burst (lbs.) | | 127 |
| Elmendorf Tear (g./mil.) | MD | 1180 |
| | TD | 1210 |
| Permeability IPV (g./100m.²/24 hrs.) | | 64 |

EXAMPLE 11—Comparative Example

Three laminated structures are prepared by the lamination techniques described in example 1 and designated samples A, B, and C. Sample A is prepared from a cut sheet of expanded polystyrene beads bonded together, the sheet being prepared substantially in accordance with the specifications of Cowman U.S. Pat. No. 3,229,814. A film of polyvinyl chloride/vinyl acetate is laminated to both sides of the beaded foam sheet.

Samples B and C are prepared from the materials described in example 1 of the instant specification, using an oriented polystyrene foam sheet. Samples B and C vary only in the thickness of the laminated structure. The physical characteristics of the three samples are compared and are summarized in the table below.

| | A | B | C |
|---|---|---|---|
| Thickness (mils) | 41.1 | 34 | 42 |
| Tenacity (K p.s.i.) | 0.78 | 0.95 | 1.02 |
| Elongation (percent) | 2.4 | 175 | 185 |
| Modluus (K p.s.i.) MD/TD | 44.7/44.7 | 40/36 | 40/36 |
| Tabor stiffness (gm./cm.) Σ (MD+TD) | 820 | 500 | 880 |
| Crush (lbs.) | 245 | 150 | 210 |
| Elmendorf tear (gms./mil): | | | |
| MD | 132 | 350 | 450 |
| TD | 130 | 600 | 750 |
| Maximum heat draw (diam./depth) | 1/1 | 1/3 | 1/3 |
| Embossing | Breaks | Excellent | Excellent |
| Cutting and creasing | Poor | Excellent | Excellent |

The beaded foam structure, with its low elongation and poor tear, is not suitable for the manufacture of cartons. The structure does not cut or crease well because of its brittle nature and it does not emboss because of its low elongation.

EXAMPLE 12

The surface of a sheet of oriented polystyrene foam having a thickness of 25 mils is heated to a temperature of 140° C. (as measured by a surface pyrometer) while maintaining the bulk of the foam below 80° C., its distortion temperature. General purpose polystyrene [1] is extruded at a melt temperature of 240° C. onto the preheated foam with an air gap of three-fourth inch. The speed was 35 FPM, film thickness was 1.0–0.2 mils. The process was repeated on the other side. The resultant laminate was 27.6 mils thick with a Taber stiffness of 200 g. cm. machine direction and 150 g. cm. transverse direction. The laminate exhibits the following adhesive bond strengths; on side 1–CNS, MD, 500 gs./in. TD; side 2–CNS, MD, 240 g./in. TD.

[1] "Lustrex-77" commercially available from Monsanto Co., St. Louis, Mo., having a Tensile Modulus of 450,000 p.s.i.

The laminate is thermoformed into serving dishes, containers for cottage cheese and decorative plaques using commercial thermoforming apparatus. The laminate is heated on both sides for 7–8 seconds by infrared heaters positioned 4 inches from each surface. The surface temperature of the laminate, after heating, is 120° C. while the temperature of the foam core is 85° C. A male mold is forced into the sheet and into a female mold 0.1 second later. A vacuum is applied at a pressure of 14.7 /in.² until the laminate is cooled below 67° C. The rigid, formed structure is then removed.

EXAMPLE 13

A high impact polystyrene is prepared from a mixture of a polystyrene,[2] and 6 percent styrene/butadiene/styrene block copolymer,[3] rubber milled at 240° C. The resulting blend has a Tensile modulus of 325,000 p.s.i. The mixture is extruded onto preheated 30 mil. polystyrene foam as in example 12, at an extrusion temperature of 255° C. The film has a final thickness of 1 mil.–0.1 mil., and an elongation of 75 percent. CNS bonds are obtained on both sides of the laminate. The laminate is thermoformable and can be cut and creased with conventional apparatus without cracking the film surface. The product does not delaminate at edges when soaked in hot lard at 155° F. for 5 hours.

[2] "Styron 666" commercially available from Dow Chemical Company.
[3] "Kraton X4119" commercially available from Shell Chemical Company.

EXAMPLE 14

Example 12 is repeated, except that the film-forming polymer used is a rubber modified polystyrene [4] and is extruded at a temperature of 260° C. to give a film thickness of about 1 mil.–0.1 mil. and a film elongation of 32 percent. The resulting laminate exhibits adhesion, cuttability, creasability and resistance to delamination equal to the product of example 13.

[4] "Styron 475B" commercially available from Dow Chemical Company having a Tensile modulus of 360,000 p.s.i.

EXAMPLE 15

Example 14 is repeated, except the film-forming polymer further comprises 3 percent titanium dioxide and the film has an Elongation of 40 percent. A white pigmented product is obtained having performance characteristics equal to those of the product of example 13.

EXAMPLES 16-18

Example 12 is repeated, except that the film-forming polymer used is a mixture of rubber modified polystyrene[5] and a 94/6 polyvinyl chloride/polypropylene blend. The ratios of the polystyrene and the blend are 50/50, 25/75 and 75/25 in examples 16, 17 and 18 respectively. All mixtures further comprise 1 percent di(N-octyl) tri S,S'-bis(isooctylmercaptoacetate) stabilizer. The 50/50 blend has an Elongation of 35 percent. The mixtures are extruded onto the preheated foam surface at a temperature of 200° C. to give a vinyl film thickness of 1.2–0.3 mils. The resulting laminated structures are thermoformable, resistant to delamination, cuttable and creasable. The peel value of the film from the foam core range from 360 grams per inch to 480 grams per inch.

[5] "Styron 475B" commercially available from Dow Chemical Company.

EXAMPLE 19

Example 18 is repeated, except that an ethylene vinyl acetate copolymer[6] is used instead of the polystyrene, and the proportion of the mixture is 50/50. The film layers each have a thickness of 1.0 mil.–0.1 mil., an Elongation of 220 percent, and a Tensile Modulus of 160,000 p.s.i. The resulting laminated structure exhibits performance characteristics equal to the products of examples 16–18.

[6] "Elvax 260" commercially available from E. I. du Pont de Nemours and Company having a Tensile modulus of 160,000 p.s.i.

EXAMPLE 20

A laminate is prepared from an oriented polystyrene foam having a nominal thickness of 45 mils and an oriented dual-layer film having a thickness of 1.98 to 2.2 mils, an Elongation of 28–32 percent, and a Tensile Modulus of 370,000 p.s.i. The bottom layer of the film comprises 88 percent rubber modified polystyrene[7] 6 percent general purpose polystyrene and 6 percent titanium dioxide. The second layer of the film consists essentially of a 0.15 to 0.22 mil. thickness of "Styron 666" Polystyrene. The laminated structure is prepared in an apparatus similar to that shown in FIG. 1. The polystyrene foam is preheated to a surface temperature of 120° C. while the body of the foam is maintained at a lower temperature through contact with a 50° C. cold roll drum. The film is preheated to a temperature of about 150° C. and brought into nip contact with the preheated foam surface. The procedure is repeated to adhere film to the opposite surface of the foam core and the composite is allowed to cool to room temperature while being maintained in a substantially flat condition.

[7] "Styron 475."

The example is repeated except that the films used in examples 16 and 19 are used instead of the dual-layer film. In all cases, the resulting laminate exhibits satisfactory adhesion, cuttability, creasability and resistance to delamination.

We claim:

1. A laminated structure comprising
   a. a core of closed cell foam having been biaxially stretched about from 2 to 12 times in each of two mutually perpendicular directions, the foam having an elongation of less than about 50 percent and consisting essentially of styrene polymer having a tensile modulus greater than 150,000 p.s.i., and
   b. thermoplastic film having a tensile modulus greater than 150,000 p.s.i. and thermoformable within a temperature of about from 50° to 230° C., bonded to both sides of the core.

2. A creasable laminar structure of claim 1 wherein the thermoplastic film has a percent elongation at break greater than the function ($t/R$) wherein $t$ is the thickness of the film and R is the radius of the creasing edge.

3. A laminar structure of claim 2 wherein the elongation at break of the films is greater than about 5 percent.

4. A laminar structure of claim 2 wherein the film-foam bond strength is at least 250 grams per lineal inch.

5. A laminar structure of claim 1 wherein the oriented foam is oriented polystyrene foam.

6. A laminar structure of claim 1 wherein the oriented foam is oriented poly(alpha-methylstyrene) foam.

7. A laminar structure of claim 1 wherein the thermoplastic film is biaxially oriented polyvinyl chloride.

8. A laminar structure of claim 1 wherein the film comprises up to about 25 percent pigment.

9. A laminar structure of claim 8 wherein the pigment is titanium dioxide.

10. A laminar structure of claim 1 wherein the film is biaxially oriented.

11. A laminar structure of claim 1 wherein the film is uniaxially oriented.

12. A laminar structure of claim 11 wherein the film is bonded to the core in a manner such that the orientation axes of the outer films are in opposite directions.

13. A laminar structure of claim 1 wherein the thermoplastic film is heat-seal bonded to the oriented foam core.

14. A laminar structure of claim 1 wherein the thermoplastic film is adhesively bonded to the oriented foam core.

15. A laminar structure of claim 14 wherein the adhesive comprises ethylene/vinyl acetate copolymer.

16. A laminar composite of claim 14 wherein the adhesive further comprises up to the critical volume concentration of titanium dioxide pigment.

17. A laminar structure comprising
    a. a core of closed cell polystyrene foam having been stretched about 5 times in the transverse direction and about from 3 to 12 times in the machine direction, the foam having an elongation of less than about 50 percent and the polystyrene having a tensile modulus greater than 150,000 p.s.i., and
    b. biaxially oriented polyvinyl chloride film adhesively bonded to both sides of the core with 72/28 ethylene/vinyl acetate resin.

* * * * *

PO-1050
(5/69)

UNITED STATES PATENT OFFICE
CERTIFICATE OF CORRECTION

Patent No. 3,619,344           Dated November 9, 1971

Inventor(s)    Leon Edward WOLINSKI and Roland G. HARRIS

It is certified that error appears in the above-identified patent and that said Letters Patent are hereby corrected as shown below:

Column 2, line 23, "form" should read --foam--;
Column 3, line 71, "from" should read --for--;
Column 4, lines 16-18, a sentence is repeated:
Column 4, line 54, "is" should read --in--;
Column 6, line 37, a comma should be inserted after the word "strength":
Column 7, line 14, "melted" should read --melt--;
Column 7, line 32, the word --Taber-- should be inserted before "Stiffness":
Column 7, line 43, "(0/1000 sq. ft.)" should read --(#/1000 sq. ft.)--;
Column 8, line 1, "printing" should read --printed--;
Column 8, line 47, "Elva®" should read --Elvax®--;
Column 10, line 64, "1 mil.-0.1 mil." should read --1 mil. ± 0.1 mil.--;
Column 11, line 23, "1.0 mil.-0.1 mil." should read --1.0 mil. ± 0.1 mil.--;
Column 11, line 51, footnote 7, "475." should read --475B--.

Signed and sealed this 15th day of August 1972.

(SEAL)
Attest:

EDWARD M.FLETCHER,JR.        ROBERT GOTTSCHALK
Attesting Officer               Commissioner of Patents